(12) United States Patent
Rich

(10) Patent No.: X5838
(45) Date of Patent: Feb. 19, 1830

(54) SAW MILL, DOGS

(76) Inventor: Martin Rich

Martin Rich. Candor. New York

Letters Patent

The Schedule referred to in these Letters Patent and making part of the same containing a description in the words of the said Martin Rich himself of his improvement in Iron dogs for a Saw Mill Know all men by these presents that I Martin Rich of the Town of Candor in the County of Tioga & State of New York have made and in-
vented a new and useful improvement in the Iron dogs for a Saw Mill in the words following to wit. The Blocks to which the dogs are made fast are similar to the common head Block now in use. The Dogs are two half Bails on each Block. like those generally used except the fol-
lowing difference. One of the half bails has three teeth two of them on the upright part of the dog one at the top and the other about the centre these teeth must be of sufficient length and width for a screw to pass thro each. Two screws are made of Iron about three fourths of an inch in diameter & about four inches long. these screws are for a set or guage for the sawed side of the log to bear against. A nut about two in-
ches square is put on the end of each screw next to the log. also a nut on each screw on the other side of the tooth for the purpose of binding the screw if it should ever wear loose. The other tooth in the quarter round so far from the upper tooth on the upright part as to admit the screw. The other half bail is to have three similar teeth except as follows: The upper tooth on the upright part is to be a double tooth that is to say. one half of this tooth is to be perpendicular on the edge. The other half horizontal about half an inch shorter. The two upper teeth on the bail about two inches apart. The advantage in the abovedescribed dogs over any other now in use is that the boards will all be of an equal thickness: that the saw will run entirely through the log, that it is more convenient to set in the night than any other. What I claim as my im-
provement is the particular situation & construction of the teeth & the serves to set the log. In Testimony that the above is a true specification of my said improvement as by me described I have hereunto set my hand and Seal this twenty third day of December one thousand eight hundred and twenty nine Witnesses
Wm. Fred Talmadge Jr.
Lorel Preston Martin Rich
(Seal)

(Attest)